US011875955B2

(12) United States Patent
Yoshitomo et al.

(10) Patent No.: US 11,875,955 B2
(45) Date of Patent: Jan. 16, 2024

(54) VACUUM CIRCUIT BREAKER

(71) Applicant: Mitsubishi Electric Corporation, Tokyo (JP)

(72) Inventors: Yuji Yoshitomo, Tokyo (JP); Kazuki Sugino, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 267 days.

(21) Appl. No.: 17/594,962

(22) PCT Filed: Jun. 7, 2019

(86) PCT No.: PCT/JP2019/022801

§ 371 (c)(1),
(2) Date: Nov. 4, 2021

(87) PCT Pub. No.: WO2020/246039

PCT Pub. Date: Dec. 10, 2020

(65) Prior Publication Data

US 2022/0310336 A1 Sep. 29, 2022

(51) Int. Cl.
*H01H 33/666* (2006.01)

(52) U.S. Cl.
CPC ... *H01H 33/666* (2013.01); *H01H 2033/6667* (2013.01)

(58) Field of Classification Search
CPC .... H01H 33/666; H01H 33/122; H01H 33/28; H01H 33/42; H01H 33/56; H01H 33/64;
(Continued)

(56) References Cited

U.S. PATENT DOCUMENTS 3,527,910 A * 9/1970 Kline .................. H01H 33/666 218/120
3,883,709 A * 5/1975 Cole .................... H02B 13/075 218/119

(Continued)

FOREIGN PATENT DOCUMENTS

JP S6130487 B2 7/1986
JP 2002281620 A 9/2002
JP 2016127744 A 7/2016

OTHER PUBLICATIONS

International Search Report (PCT/ISA/210) with English translation and Written Opinion (PCT/ISA/237) dated Jul. 9, 2019, by the Japan Patent Office as the International Searching Authority for International Application No. PCT/JP2019/022801.

*Primary Examiner* — William A Bolton
(74) *Attorney, Agent, or Firm* — BUCHANAN INGERSOLL & ROONEY PC

(57) ABSTRACT

A vacuum circuit breaker includes: an insulating rod disposed within a grounded tank; a drive conductor connected to the insulating rod; a first bushing and a second bushing connected to the side of the grounded tank; vacuum valves including movable contacts; levers rotatably coupled at end portions on one side to the insulating rod or the drive conductor; movable conductors electrically connected at end portions on one side to the movable contacts; and links rotatably coupled at end portions on one side to the end portions on the other side of the movable conductors and rotatably coupled at end portions on the other side to the end portions on the other side of the levers.

6 Claims, 6 Drawing Sheets

(58) Field of Classification Search
CPC ............... H01H 33/66; H01H 33/7053; H01H 2033/6665; H01H 2033/6667
USPC ........ 218/118, 129, 123, 134, 139–140, 146, 218/153–155
See application file for complete search history.

(56) References Cited

U.S. PATENT DOCUMENTS

| | | | | |
|---|---|---|---|---|
| 4,458,119 | A * | 7/1984 | Hashimoto .......... | H01H 33/143 218/3 |
| 8,110,770 | B2 * | 2/2012 | Ichikawa ............. | H01H 33/666 218/140 |
| 8,963,037 | B2 * | 2/2015 | Nakada ............. | H02B 13/0354 218/120 |
| 9,190,232 | B2 * | 11/2015 | Abe ................... | H02B 13/0655 |
| 9,431,800 | B2 * | 8/2016 | Yoshida ............... | H02B 13/045 |
| 9,570,256 | B2 * | 2/2017 | Yanagi ................... | H01H 33/64 |
| 9,646,785 | B2 * | 5/2017 | Inoue ................... | H01H 33/668 |
| 9,666,392 | B2 * | 5/2017 | Gruenler ................ | H01H 17/26 |
| 2002/0134757 | A1 | 9/2002 | Nishizumi et al. | |
| 2015/0180224 | A1 * | 6/2015 | Arioka ................. | H01H 33/161 361/118 |

* cited by examiner

VACUUM CIRCUIT BREAKER

FIELD

The present invention relates to a vacuum circuit breaker that includes a vacuum valve in a bushing.

BACKGROUND

Patent Literature 1 discloses a vacuum circuit breaker in which bushings are provided on the side of a grounded tank and vacuum valves for current interruption are provided in the bushings. To transmit the driving force of an operating device provided on the exterior of the grounded tank to the movable side of the vacuum valves, the vacuum circuit breaker as described above needs to include a mechanism for changing the direction of the driving force within the grounded tank.

CITATION LIST

Patent Literature

Patent Literature 1: Japanese Patent Application Laid-open No. 2016-127744

SUMMARY

Technical Problem

The grounded tank is filled with an insulating gas and is thus required to be reduced in size. The vacuum circuit breaker disclosed in Patent Literature 1 includes a link mechanism that includes a housing for guiding a member that receives the driving force of the operating device or a link mechanism for moving a member that receives the driving force of the operating device in the direction perpendicular to the longitudinal direction, within the grounded tank to change the direction of the driving force. Accordingly, the grounded tank is difficult to miniaturize and thus the entire vacuum circuit breaker is difficult to miniaturize.

The present invention has been achieved in view of the above and an object of the present invention is to provide a vacuum circuit breaker in which a mechanism disposed within a grounded tank to change the direction of a driving force is reduced in size.

Solution to Problem

In order to solve the above problems and achieve the object, the present invention includes: a tubular grounded tank; an insulating rod disposed within the grounded tank to be movable in an axial direction of the grounded tank; an operating device provided at one end portion of the grounded tank, the operating device applying a driving force in the axial direction of the grounded tank to one end portion of the insulating rod; a drive conductor disposed within the grounded tank and connected to another end portion of the insulating rod to move together with the insulating rod; a tubular first bushing connected to a side of the grounded tank; a tubular second bushing connected to the side of the grounded tank at a greater distance from the one end portion of the grounded tank than the first bushing in the axial direction of the grounded tank; and bushing terminals provided at end portions of the first bushing and the second bushing opposite the grounded tank. The present invention includes: a first vacuum valve including a first vacuum container, a first fixed contact, and a first movable contact, the first vacuum container being provided within the first bushing, the first fixed contact and the first movable contact facing each other and being disposed within the first vacuum container; a second vacuum valve including a second vacuum container, a second fixed contact, and a second movable contact, the second vacuum container being provided within the second bushing, the second fixed contact and the second movable contact facing each other and being disposed within the second vacuum container; a first fixed conductor connecting the first fixed contact and the bushing terminal of the first bushing; a second fixed conductor connecting the second fixed contact and the bushing terminal of the second bushing; a first movable conductor electrically connected at one end portion to the first movable contact; and a second movable conductor electrically connected at one end portion to the second movable contact. The present invention includes: a first lever rotatably coupled at one end portion to the insulating rod, a portion between the one end portion and another end portion of the first lever being rotatably provided within the grounded tank; a second lever rotatably coupled at one end portion to the drive conductor, a portion between the one end portion and another end portion of the second lever being rotatably provided within the grounded tank; a first link rotatably coupled at one end portion to another end portion of the first movable conductor and rotatably coupled at another end portion to the another end portion of the first lever; and a second link rotatably coupled at one end portion to another end portion of the second movable conductor and rotatably coupled at another end portion to the another end portion of the second lever. The present invention includes: a first flexible conductor having a flexibility and electrically connecting the first movable conductor and the drive conductor; and a second flexible conductor having a flexibility and electrically connecting the second movable conductor and the drive conductor.

Advantageous Effects of Invention

According to the present invention, an effect is obtained where a vacuum circuit breaker can be obtained in which a mechanism disposed within a grounded tank to change the direction of a driving force is reduced in size.

DESCRIPTION OF EMBODIMENTS

A vacuum circuit breaker according to embodiments of the present invention will be explained below in detail with reference to the drawings. This invention is not limited to the embodiments.

First Embodiment

Figure 1:
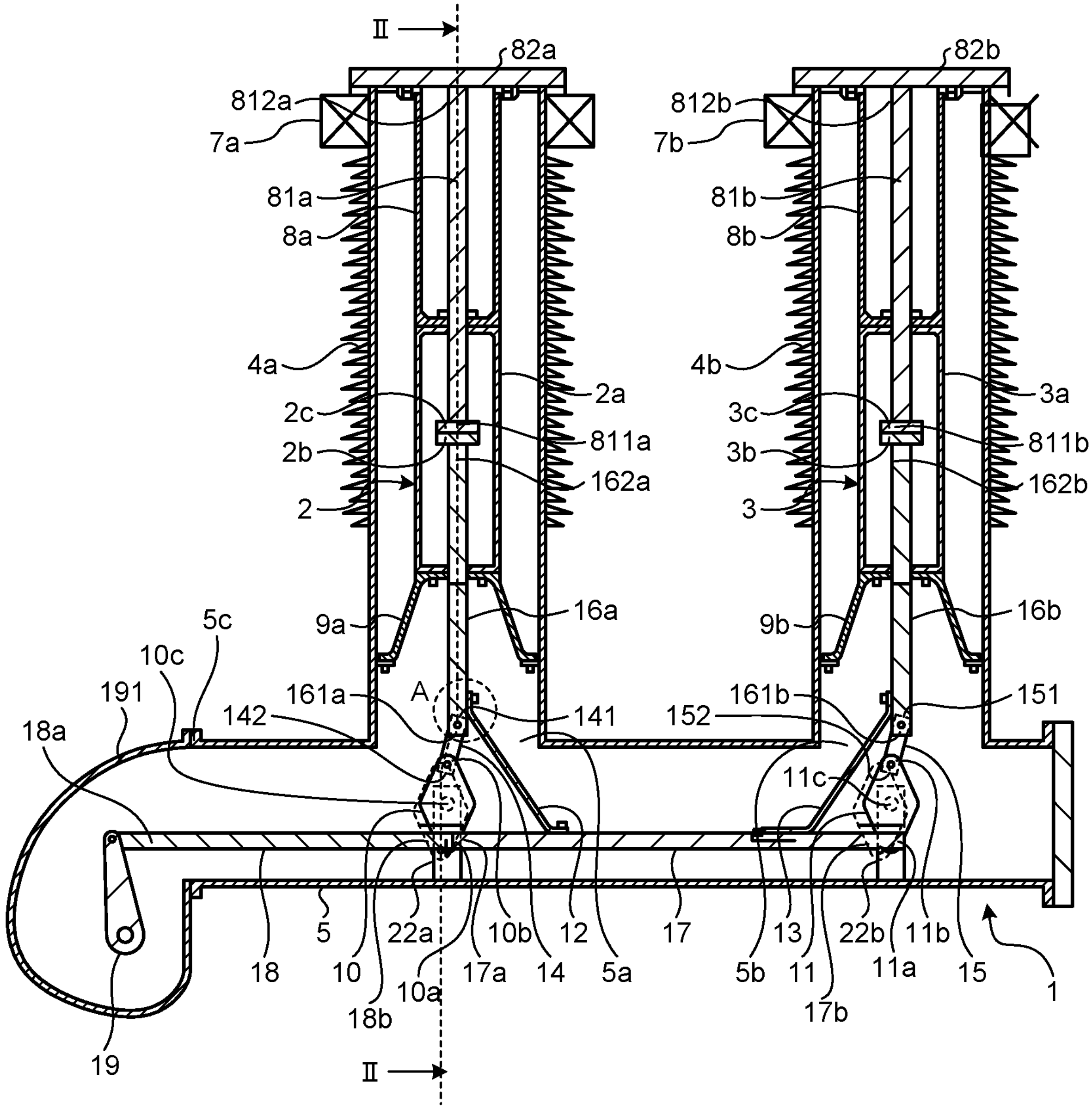
FIG. 1 is a transverse cross-sectional view of a vacuum circuit breaker according to a first embodiment of the present invention in the closed state.
Figure 2:
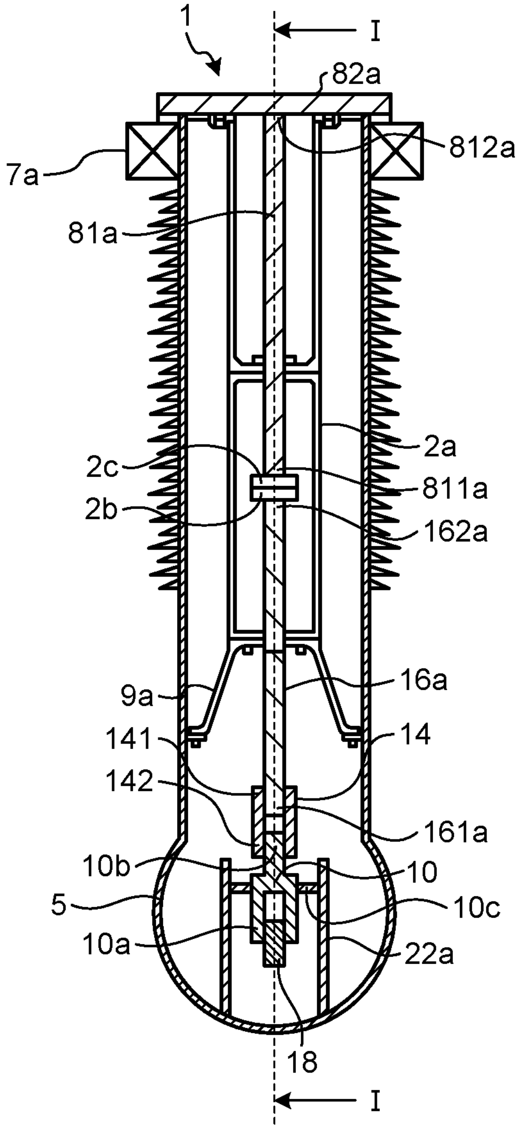
FIG. 2 is a longitudinal cross-sectional view of the vacuum circuit breaker according to the first embodiment in the closed state.
Figure 3:
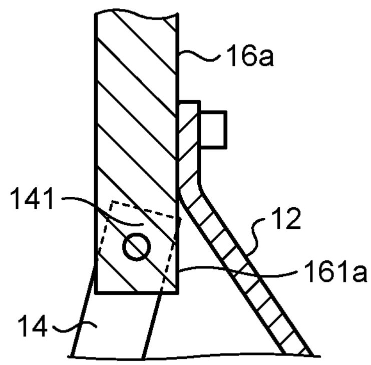
FIG. 3 is an enlarged view of a portion A in FIG. 1.

FIG. 1 is a transverse cross-sectional view of a vacuum circuit breaker according to a first embodiment of the present invention in the closed state. FIG. 2 is a longitudinal cross-sectional view of the vacuum circuit breaker according to the first embodiment in the closed state. FIG. 1 illustrates a cross-section taken along line I-I in FIG. 2. FIG. 2 illustrates a cross-section taken along line II-II in FIG. 1. FIG. 3 is an enlarged view of a portion A in FIG. 1. A vacuum circuit breaker 1 includes a grounded tank 5, an insulating rod 18, an operating device 19, a cover 191, a drive conductor 17, bushings 4*a* and 4*b*, vacuum valves 2 and 3, and insulating support tubes 8*a* and 8*b*. The grounded tank 5 has a cylindrical shape with opening portions 5*a* and 5*b* formed in the tubular surface. The grounded tank 5 is electrically grounded. The insulating rod 18 is disposed within the grounded tank 5 to be movable in the axial direction of the grounded tank 5. The operating device 19 is provided at one end portion 5*c* of the grounded tank 5 and applies the driving force in the axial direction of the grounded tank 5 to one end portion 18*a* of the insulating rod 18. The cover 191 covers the operating device 19 and is connected to the end portion of the grounded tank 5. The drive conductor 17 is disposed within the grounded tank 5. The drive conductor 17 is connected at one end portion 17*a* to the other end portion 18*b* of the insulating rod 18 and thus moves together with the insulating rod 18. The bushing 4*a* is a tubular first bushing connected to the side of the grounded tank 5. The bushing 4*b* is a tubular second bushing connected to the side of the grounded tank 5 at a greater distance from the end portion 5*c* of the grounded tank 5 than the bushing 4*a* in the axial direction of the grounded tank 5. The bushings 4*a* and 4*b* are disposed above the opening portions 5*a* and 5*b* of the grounded tank 5 and communicate with the grounded tank 5 through the opening portions 5*a* and 5*b*.

The vacuum valve 2 is a first vacuum valve provided within the bushing 4*a*. The vacuum valve 2 includes a vacuum container 2*a* that is a first vacuum container, a movable contact 2*b* that is a first movable contact, and a fixed contact 2*c* that is a first fixed contact. The vacuum container 2*a* is formed of an insulating material and has a tubular shape. The movable contact 2*b* and the fixed contact 2*c* facing each other are disposed within the vacuum container 2*a*. One end portion 162*a* of a movable conductor 16*a* that is a first movable conductor is coupled to the movable contact 2*b*. The other end portion 161*a* of the movable conductor 16*a* projects outside of the vacuum container 2*a* and is movably coupled to one end portion 141 of a link 14 that is a first link. One end portion 811*a* of a fixed conductor 81*a* that is a first fixed conductor is coupled to the fixed contact 2*c*. The other end portion 812*a* of the fixed conductor 81*a* projects outside of the vacuum container 2*a* and is connected to a bushing terminal 82*a* of the bushing 4*a*. The movable contact 2*b* and the movable conductor 16*a* are movable as a unit. The movable contact 2*b* moves between the position in contact with the fixed contact 2*c* and the position spaced from the fixed contact 2*c*.

The vacuum valve 3 is a second vacuum valve provided within the bushing 4*b*. The vacuum valve 3 includes a vacuum container 3*a* that is a second vacuum container, a movable contact 3*b* that is a second movable contact, and a fixed contact 3*c* that is a second fixed contact. The vacuum container 3*a* is formed of an insulating material and has a tubular shape. The movable contact 3*b* and the fixed contact 3*c* facing each other are disposed within the vacuum container 3*a*. One end portion 162*b* of a movable conductor 16*b* that is a second movable conductor is coupled to the movable contact 3*b*. The other end portion 161*b* of the movable conductor 16*b* projects outside of the vacuum container 3*a* and is movably coupled to one end portion 151 of a link 15 that is a second link. One end portion 811*b* of a fixed conductor 81*b* that is a second fixed conductor is coupled to the fixed contact 3*c*. The other end portion 812*b* of the fixed conductor 81*b* projects outside of the vacuum container 3*a* and is connected to a bushing terminal 82*b* of the bushing 4*b*. The movable contact 3*b* and the movable conductor 16*b* are movable as a unit. The movable contact 3*b* moves between the position in contact with the fixed contact 3*c* and the position spaced from the fixed contact 3*c*.

The bushing 4*a* is provided with a current transformer (CT) 7*a* for detecting current flowing in the fixed conductor 81*a*. The bushing 4*b* is provided with a current transformer 7*b* for detecting current flowing in the fixed conductor 81*b*.

A lever 10 that is a first lever includes a shaft 10*c* between one end portion 10*a* and the other end portion 10*b*. The shaft 10*c* is rotatably supported by a support insulator 22*a* fixed within the grounded tank 5. Thus, the lever 10 is rotatable about the shaft 10*c*. The end portion 10*a* of the lever 10 is rotatably coupled to the insulating rod 18. The other end portion 10*b* of the lever 10 is rotatably coupled to the other end portion 142 of the link 14. When the vacuum circuit breaker 1 is in the closed state, the direction of the line connecting the end portion 10*a* and the other end portion 10*b* of the lever 10 is orthogonal to the longitudinal direction of the insulating rod 18. Moreover, when the vacuum circuit breaker 1 is in the closed state, the other end portion 142 of the link 14 is located at a position closer to the end portion 5*c* of the grounded tank 5 than the end portion 141. A lever 11 that is a second lever includes a shaft 11*c* between one end portion 11*a* and the other end portion 11*b*. The shaft 11*c* is rotatably supported by a support insulator 22*b* fixed within the grounded tank 5. Thus, the lever 11 is rotatable about the shaft 11*c*. The end portion 11*a* of the lever 11 is rotatably coupled to the other end portion 17*b* of the drive conductor 17. The other end portion 11*b* of the lever 11 is rotatably coupled to the other end portion 152 of the link 15. When the vacuum circuit breaker 1 is in the closed state, the direction of the line connecting the end portion 11*a* and the other end portion 11*b* of the lever 11 is orthogonal to the longitudinal direction of the drive conductor 17. Moreover, when the vacuum circuit breaker 1 is in the closed state, the other end portion 152 of the link 15 is located at a position closer to the end portion 5*c* of the grounded tank 5 than the end portion 151.

The rotational axes of the portions at which the members described above are rotatably coupled are parallel to each other, and they extend in the direction perpendicular to the direction of movement of the insulating rod 18.

The levers 10 and 11 and the links 14 and 15 may be formed of an insulating material or may be formed of a conductive material such as metal.

The movable conductor 16*a* and the drive conductor 17 are electrically connected by a flexible conductor 12 that is a first flexible conductor. The movable conductor 16*b* and the drive conductor 17 are electrically connected by a flexible conductor 13 that is a second flexible conductor. Even if the positional relationship between the drive conductor 17 and the movable conductors 16*a* and 16*b* changes, the flexible conductors 12 and 13 elastically deform to maintain the electrical connection between the drive conductor 17 and the movable conductors 16*a* and 16*b*.

Insulating spacers 9*a* and 9*b* through which the movable conductors 16*a* and 16*b* extend are provided within the bushings 4*a* and 4*b*, respectively. The space closer to the grounded tank 5 than the insulating spacers 9*a* and 9*b* within the bushings 4*a* and 4*b*, the space within the cover 191, and the space within the grounded tank 5 are filled with an insulating gas. Examples of the insulating gas include sulfur hexafluoride; however, this is not a limitation.

Figure 4:
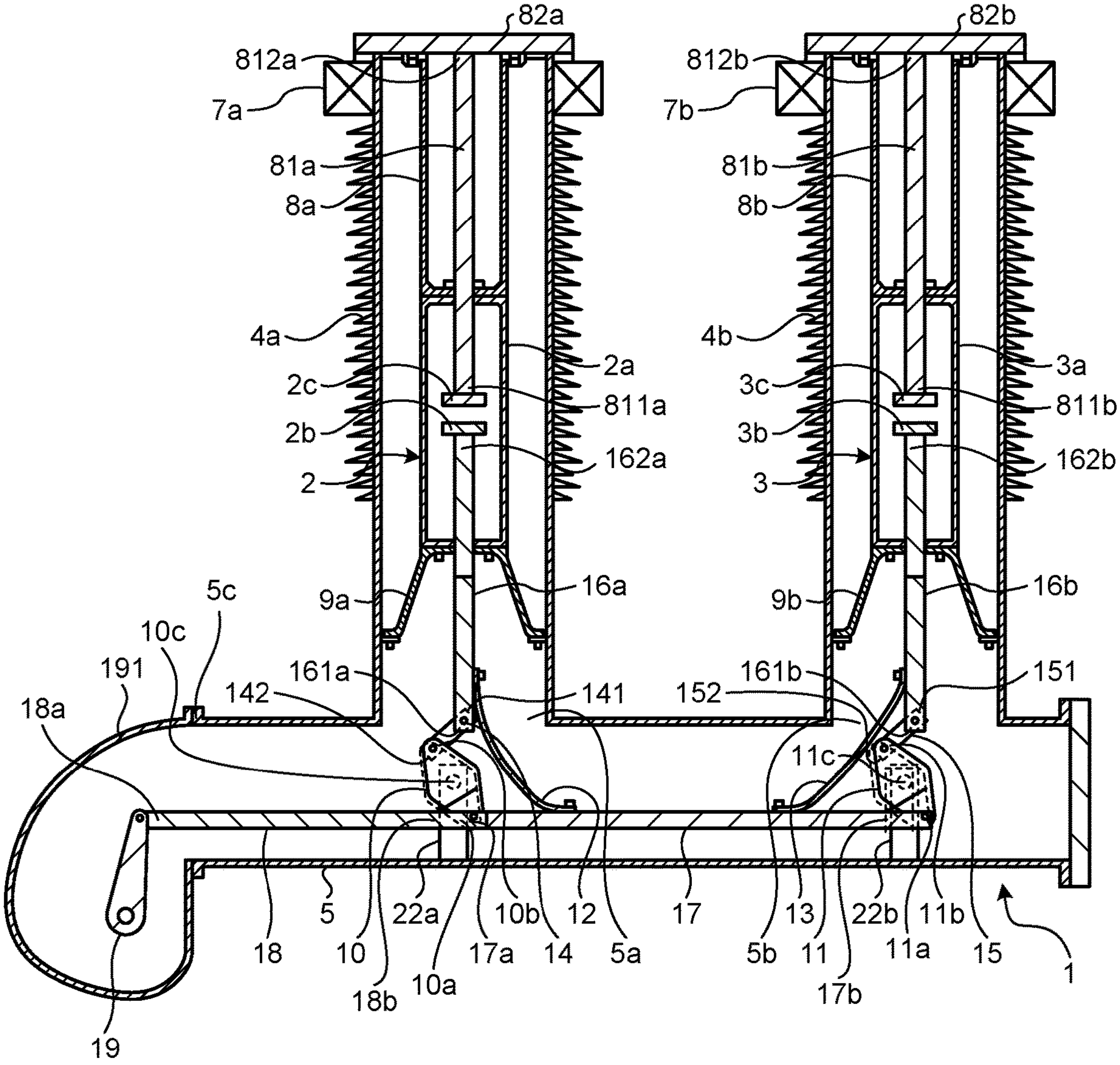
FIG. 4 is a transverse cross-sectional view of the vacuum circuit breaker according to the first embodiment in the tripped state.

A tripping operation, or opening operation, of the vacuum circuit breaker 1 according to the first embodiment will be described. FIG. 4 is a transverse cross-sectional view of the vacuum circuit breaker according to the first embodiment in the tripped state. When the operating device 19 performs the tripping operation, the insulating rod 18 and the drive conductor 17 are pushed into the grounded tank 5. The portion between the end portion 10*a* and the other end portion 10*b* of the lever 10 is rotatably supported by the support insulator 22*a*, and the insulating rod 18 is rotatably coupled to the end portion 10*a*. Moreover, when the vacuum circuit breaker 1 is in the closed state, the direction of the line connecting the end portion 10*a* and the other end portion 10*b* of the lever 10 is orthogonal to the longitudinal direction of the insulating rod 18. Thus, when the insulating rod 18 is pushed into the grounded tank 5, the lever 10 rotates about the shaft 10*c* and the other end portion 10*b* of the lever 10 moves in the direction opposite to the direction of movement of the insulating rod 18. At this point in time, the other end portion 10*b* of the lever 10 approaches the insulating rod 18 with the rotation of the lever 10. When the other end portion 10*b* of the lever 10 approaches the insulating rod 18, the other end portion 142 of the link 14 rotatably coupled to the other end portion 10*b* of the lever 10 also moves together with the other end portion 10*b* of the lever 10, and the movable conductor 16*a* movably coupled to the end portion 141 of the link 14 is drawn toward the grounded tank 5 and thus the movable contact 2*b* and the fixed contact 2*c* are separated from each other. The flexible conductor 12 elastically deforms, so that even if the positional relationship between the drive conductor 17 and the movable conductor 16*a* changes, the electrical connection between the drive conductor 17 and the movable conductor 16*a* is maintained.

In a similar manner, the portion between the end portion 11*a* and the other end portion 11*b* of the lever 11 is rotatably supported by the support insulator 22*b*, and the drive conductor 17 is rotatably coupled to the end portion 11*a*. Moreover, when the vacuum circuit breaker 1 is in the closed state, the direction of the line connecting the end portion 11*a* and the other end portion 11*b* of the lever 11 is orthogonal to the longitudinal direction of the drive conductor 17. Thus, when the drive conductor 17 is pushed into the grounded tank 5 together with the insulating rod 18, the lever 11 rotates about the shaft 11*c* and the other end portion 11*b* of the lever 11 moves in the direction opposite to the direction of movement of the drive conductor 17. At this point in time, the other end portion 11*b* of the lever 11 approaches the drive conductor 17 with the rotation of the lever 11. When the other end portion 11*b* of the lever 11 approaches the drive conductor 17, the other end portion 152 of the link 15 rotatably coupled to the other end portion 11*b* of the lever 11 also moves together with the other end portion 11*b* of the lever 11, and the movable conductor 16*b* movably coupled to the end portion 151 of the link 15 is drawn toward the grounded tank 5 and thus the movable contact 3*b* and the fixed contact 3*c* are separated from each other. The flexible conductor 13 elastically deforms, so that even if the positional relationship between the drive conductor 17 and the movable conductor 16*b* changes, the electrical connection between the drive conductor 17 and the movable conductor 16*b* is maintained.

The movable contact 2*b* and the fixed contact 2*c* are separated from each other and the movable contact 3*b* and the fixed contact 3*c* are separated from each other, so that current flowing between the bushing terminals 82*a* and the bushing terminal 82*b* is interrupted.

A closing operation of the vacuum circuit breaker 1 according to the first embodiment will be described. When the operating device 19 performs the closing operation, the insulating rod 18 and the drive conductor 17 are drawn from the grounded tank 5. The portion between the end portion 10*a* and the other end portion 10*b* of the lever 10 is rotatably supported by the support insulator 22*a*, and the insulating rod 18 is rotatably coupled to the end portion 10*a*. Thus, when the insulating rod 18 is drawn from the grounded tank 5, the lever 10 rotates about the shaft 10*c* and the other end portion 10*b* of the lever 10 moves in the direction opposite to the direction of movement of the insulating rod 18. At this point in time, the other end portion 10*b* of the lever 10 moves away from the insulating rod 18 with the rotation of the lever 10. When the other end portion 10*b* of the lever 10 moves away from the insulating rod 18, the other end portion 142 of the link 14 rotatably coupled to the other end portion 10*b* of the lever 10 also moves together with the other end portion 10*b* of the lever 10, and the movable conductor 16*a* movably coupled to the end portion 141 of the link 14 is pushed toward the bushing 4*a* and thus the movable contact 2*b* and the fixed contact 2*c* come into contact with each other.

In a similar manner, the portion between the end portion 11*a* and the other end portion 11*b* of the lever 11 is rotatably supported by the support insulator 22*b*, and the drive conductor 17 is rotatably coupled to the end portion 11*a*. Thus, when the drive conductor 17 is drawn from the grounded tank 5 together with the insulating rod 18, the lever 11 rotates about the shaft 11*c* and the other end portion 11*b* of the lever 11 moves in the direction opposite to the direction of movement of the drive conductor 17. At this point in time, the other end portion 11*b* of the lever 11 moves away from the drive conductor 17 with the rotation of the lever 11. When the other end portion 11*b* of the lever 11 moves away from the drive conductor 17, the other end portion 152 of the link 15 rotatably coupled to the other end portion 11*b* of the lever 11 also moves together with the other end portion 11*b* of the lever 11, and the movable conductor 16*b* movably coupled to the end portion 151 of the link 15 is pushed toward the bushing 4*b* and thus the movable contact 3*b* and the fixed contact 3*c* come into contact with each other.

The movable contact 2*b* and the fixed contact 2*c* come into contact with each other and the movable contact 3*b* and the fixed contact 3*c* come into contact with each other, so that current flows between the bushing terminal 82*a* and the bushing terminal 82*b*.

In the vacuum circuit breaker 1 according to the first embodiment, the drive conductor 17 is responsible for transmission of the driving force and electrical connection, and the direction of the driving force of the operating device 19 is changed with a simple configuration including the levers 10 and 11 and the links 14 and 15. Therefore, the structure disposed within the grounded tank 5 can be reduced in size and thus the overall size of the grounded tank 5 can be reduced.

Second Embodiment

Figure 5:
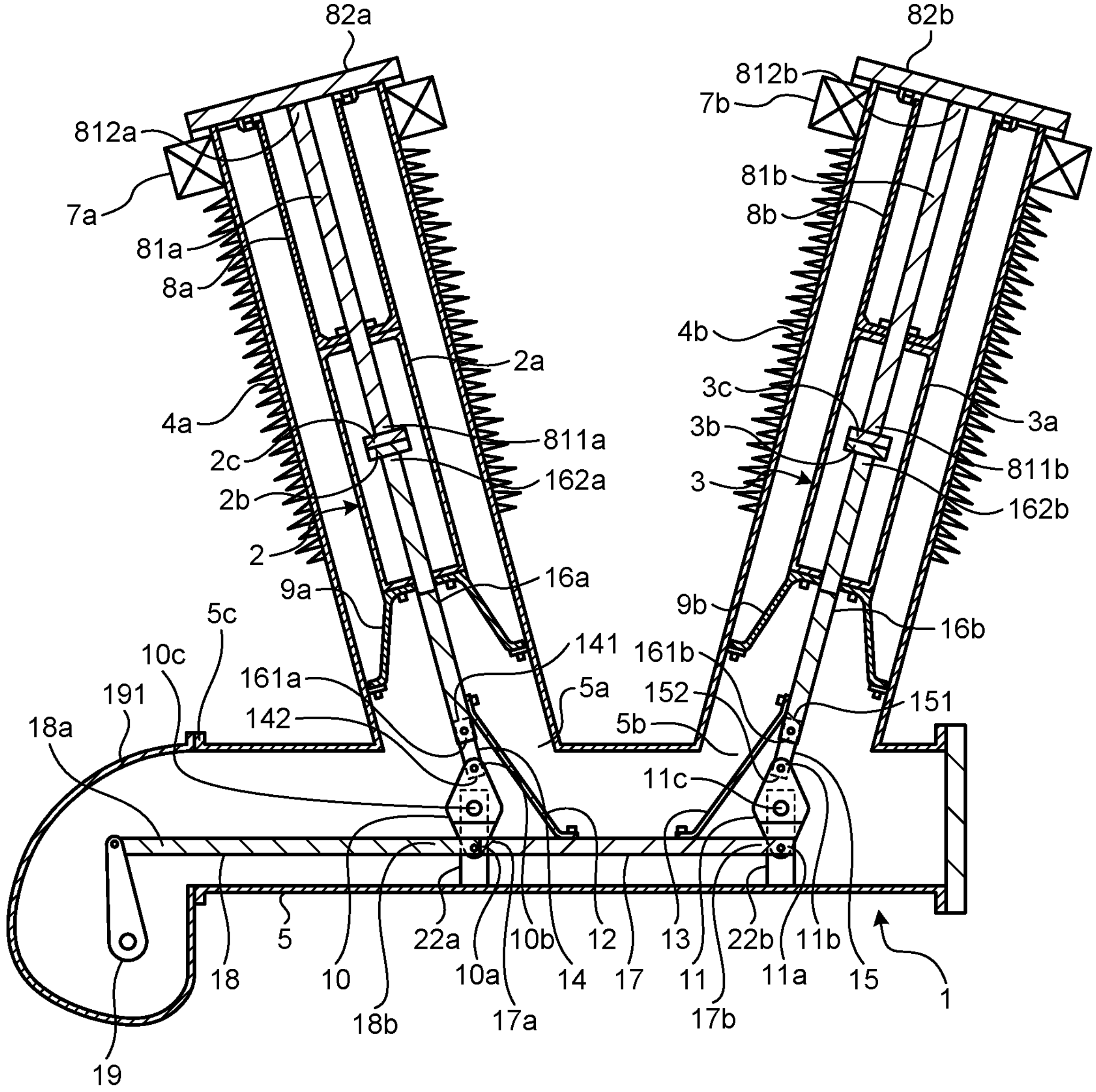
FIG. 5 is a transverse cross-sectional view of a vacuum circuit breaker according to a second embodiment of the present invention.

FIG. 5 is a transverse cross-sectional view of a vacuum circuit breaker according to a second embodiment of the present invention. The vacuum circuit breaker 1 according to the second embodiment is different from the vacuum circuit breaker 1 according to the first embodiment in that the bushings 4*a* and 4*b* are disposed to be inclined relative to the axial direction of the grounded tank 5 such that the interval between the bushings 4*a* and 4*b* on the side closer to the bushing terminals 82*a* and 82*b* is wider.

In the vacuum circuit breaker 1 according to the second embodiment, the insulation distance between the bushing terminals 82*a* and 82*b* is longer than that in the vacuum circuit breaker 1 according to the first embodiment, so that the withstand voltage of the vacuum circuit breaker 1 can be improved. Moreover, the same insulation distance as that in the vacuum circuit breaker 1 according to the first embodiment can be ensured with the shorter bushings 4*a* and 4*b*; therefore, the vacuum circuit breaker 1 can be reduced in size.

Third Embodiment

Figure 6:
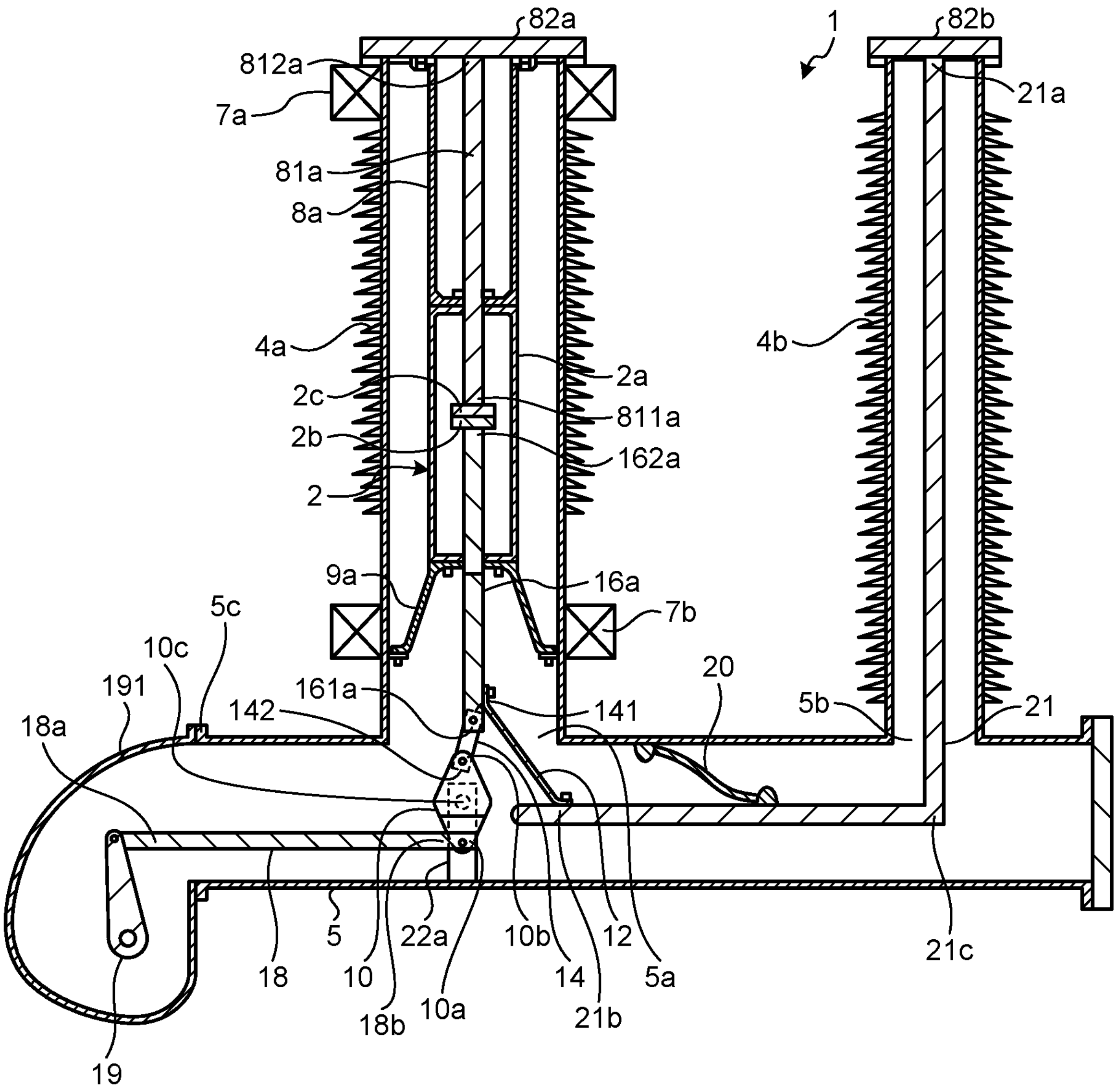
FIG. 6 is a transverse cross-sectional view of a vacuum circuit breaker according to a third embodiment of the present invention.

FIG. 6 is a transverse cross-sectional view of a vacuum circuit breaker according to a third embodiment of the present invention. The vacuum circuit breaker 1 according to the third embodiment does not include the vacuum valve 3 but includes a central conductor 21 disposed across the bushing 4*b* and the grounded tank 5. One end portion 21*a* of the central conductor 21 is electrically connected to the bushing terminal 82*b*. The central conductor 21 includes a bent portion 21*c* having the same angle as the angle formed by the grounded tank 5 and the bushing 4*b*. The other end portion 21*b* of the central conductor 21 is electrically connected to the movable conductor 16*a* by the flexible conductor 12. The portion between the other end portion 21*b* and the bent portion 21*c* of the central conductor 21 is supported by an insulating support base 20. The current transformer 7*b* is provided on the lower portion of the bushing 4*a*.

In the vacuum circuit breaker 1 according to the third embodiment, only the central conductor 21 is disposed within the bushing 4*b*; therefore, the diameter of the bushing 4*b* can be reduced and thus the entire vacuum circuit breaker 1 can be reduced in size.

Fourth Embodiment

Figure 7:
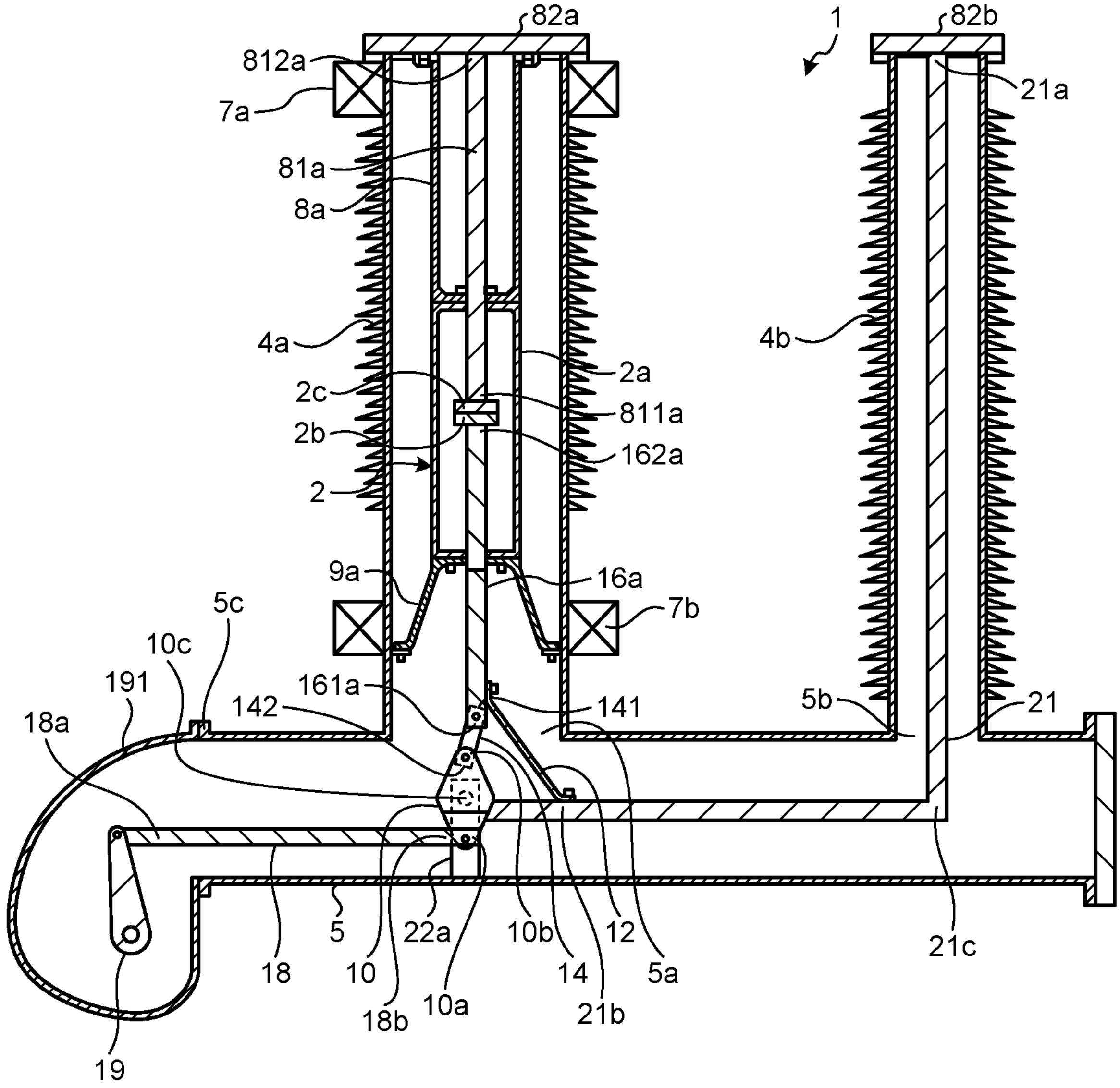
FIG. 7 is a transverse cross-sectional view of a vacuum circuit breaker according to a fourth embodiment of the present invention.

FIG. 7 is a transverse cross-sectional view of a vacuum circuit breaker according to a fourth embodiment of the present invention. The vacuum circuit breaker 1 according to the fourth embodiment is different from the vacuum circuit breaker 1 according to the third embodiment in that the insulating support base 20 is not provided and the other end portion 21*b* of the central conductor 21 is fixed to the shaft 10*c* that is the rotational shaft of the lever 10.

In the vacuum circuit breaker 1 according to the fourth embodiment, the insulating support base 20 does not need to be provided within the grounded tank 5; therefore, the grounded tank 5 can be reduced in size.

The configurations described in the above embodiments are only examples of an aspect of the present invention. The configurations can be combined with other well-known techniques, and can be partly omitted or modified without departing from the scope of the present invention.

REFERENCE SIGNS LIST

1 vacuum circuit breaker; 2, 3 vacuum valve; 2*a*, 3*a* vacuum container; 2*b*, 3*b* movable contact; 2*c*, 3*c* fixed contact; 4*a*, 4*b* bushing; 5 grounded tank; 5*a*, 5*b* opening portion; 5*c*, 10*a*, 11*a*, 17*a*, 18*a*, 21*a*, 141, 151, 162*a*, 162*b*, 811*a*, 811*b* one end portion; 7*a*, 7*b* current transformer; 8*a*, 8*b* insulating support tube; 9*a*, 9*b* insulating spacer; 10, 11 lever; 10*b*, 11*b*, 17*b*, 18*b*, 21*b*, 142, 152, 161*a*, 161*b*, 812*a*, 812*b* other end portion; 10*c*, 11*c* shaft; 12, 13 flexible conductor; 14, 15 link; 16*a*, 16*b* movable conductor; 17 drive conductor; 18 insulating rod; 19 operating device; 20 insulating support base; 21 central conductor; 21*c* bent portion; 22*a*, 22*b* support insulator; 81*a*, 81*b* fixed conductor; 82*a*, 82*b* bushing terminal; 191 cover.

The invention claimed is:

1. A vacuum circuit breaker comprising:

a tubular grounded tank;

an insulating rod disposed within the grounded tank to be movable in an axial direction of the grounded tank;

an operating device provided at one end portion of the grounded tank, the operating device applying a driving force in the axial direction of the grounded tank to one end portion of the insulating rod;

a drive conductor disposed within the grounded tank and connected to another end portion of the insulating rod to move together with the insulating rod;

a tubular first bushing connected to a side of the grounded tank;

a tubular second bushing connected to the side of the grounded tank at a greater distance from the one end portion of the grounded tank than the first bushing in the axial direction of the grounded tank;

bushing terminals provided at end portions of the first bushing and the second bushing opposite the grounded tank;

a first vacuum valve including a first vacuum container, a first fixed contact, and a first movable contact, the first vacuum container being provided within the first bushing, the first fixed contact and the first movable contact facing each other and being disposed within the first vacuum container;

a second vacuum valve including a second vacuum container, a second fixed contact, and a second movable contact, the second vacuum container being provided within the second bushing, the second fixed contact and the second movable contact facing each other and being disposed within the second vacuum container;

a first fixed conductor connecting the first fixed contact and the bushing terminal of the first bushing;

a second fixed conductor connecting the second fixed contact and the bushing terminal of the second bushing;

a first movable conductor electrically connected at one end portion to the first movable contact;

a second movable conductor electrically connected at one end portion to the second movable contact;

a first lever rotatably coupled at one end portion to the insulating rod, a portion between the one end portion and another end portion of the first lever being rotatably provided within the grounded tank;

a second lever rotatably coupled at one end portion to the drive conductor, a portion between the one end portion and another end portion of the second lever being rotatably provided within the grounded tank;

a first link rotatably coupled at one end portion to another end portion of the first movable conductor and rotatably coupled at another end portion to the another end portion of the first lever;

a second link rotatably coupled at one end portion to another end portion of the second movable conductor and rotatably coupled at another end portion to the another end portion of the second lever;

a first flexible conductor having a flexibility and electrically connecting the first movable conductor and the drive conductor; and a second flexible conductor having a flexibility and electrically connecting the second movable conductor and the drive conductor.

2. The vacuum circuit breaker according to claim 1, wherein an interval between the first bushing and the second bushing on a side closer to the bushing terminals is wider than an interval between the first bushing and the second bushing on a side closer to the grounded tank.

3. A vacuum circuit breaker comprising:

a tubular grounded tank;

an insulating rod disposed within the grounded tank to be movable in an axial direction of the grounded tank;

an operating device provided at one end portion of the grounded tank, the operating device applying a driving force in the axial direction of the grounded tank to one end portion of the insulating rod;

a tubular first bushing connected to a side of the grounded tank;

a tubular second bushing connected to the side of the grounded tank at a greater distance from the one end portion of the grounded tank than the first bushing in the axial direction of the grounded tank;

bushing terminals provided at end portions of the first bushing and the second bushing opposite the grounded tank;

a vacuum valve including a vacuum container, a fixed contact, and a movable contact, the vacuum container being provided within the first bushing, the fixed contact and the movable contact facing each other and being disposed within the vacuum container;

a fixed conductor connecting the fixed contact and the bushing terminal of the first bushing;

a movable conductor electrically connected at one end portion to the movable contact;

a lever rotatably provided within the grounded tank and rotatably coupled at one end portion to the insulating rod;

a link rotatably coupled at one end portion to another end portion of the movable conductor and rotatably coupled at another end portion to another end portion of the lever;

a central conductor connected at one end portion to the bushing terminal of the second bushing, another end portion of the central conductor being disposed within the grounded tank; and a flexible conductor having a flexibility and electrically connecting the movable conductor and the central conductor.

4. The vacuum circuit breaker according to claim 3, wherein the central conductor includes a bent portion bent at a same angle as an angle formed by the grounded tank and the second bushing, and the vacuum circuit breaker includes an insulating support base to support, in the grounded tank, a portion between the another end portion and the bent portion of the central conductor.

5. The vacuum circuit breaker according to claim 3, wherein the another end portion of the central conductor is supported by a rotational shaft of the lever.

6. The vacuum circuit breaker according to claim 3, wherein an interval between the first bushing and the second bushing on a side closer to the bushing terminals is wider than an interval between the first bushing and the second bushing on a side closer to the grounded tank.

* * * * *